April 29, 1941. G. C. BRUEN 2,240,325
CARD TRAY
Filed Aug. 7, 1939 5 Sheets-Sheet 1
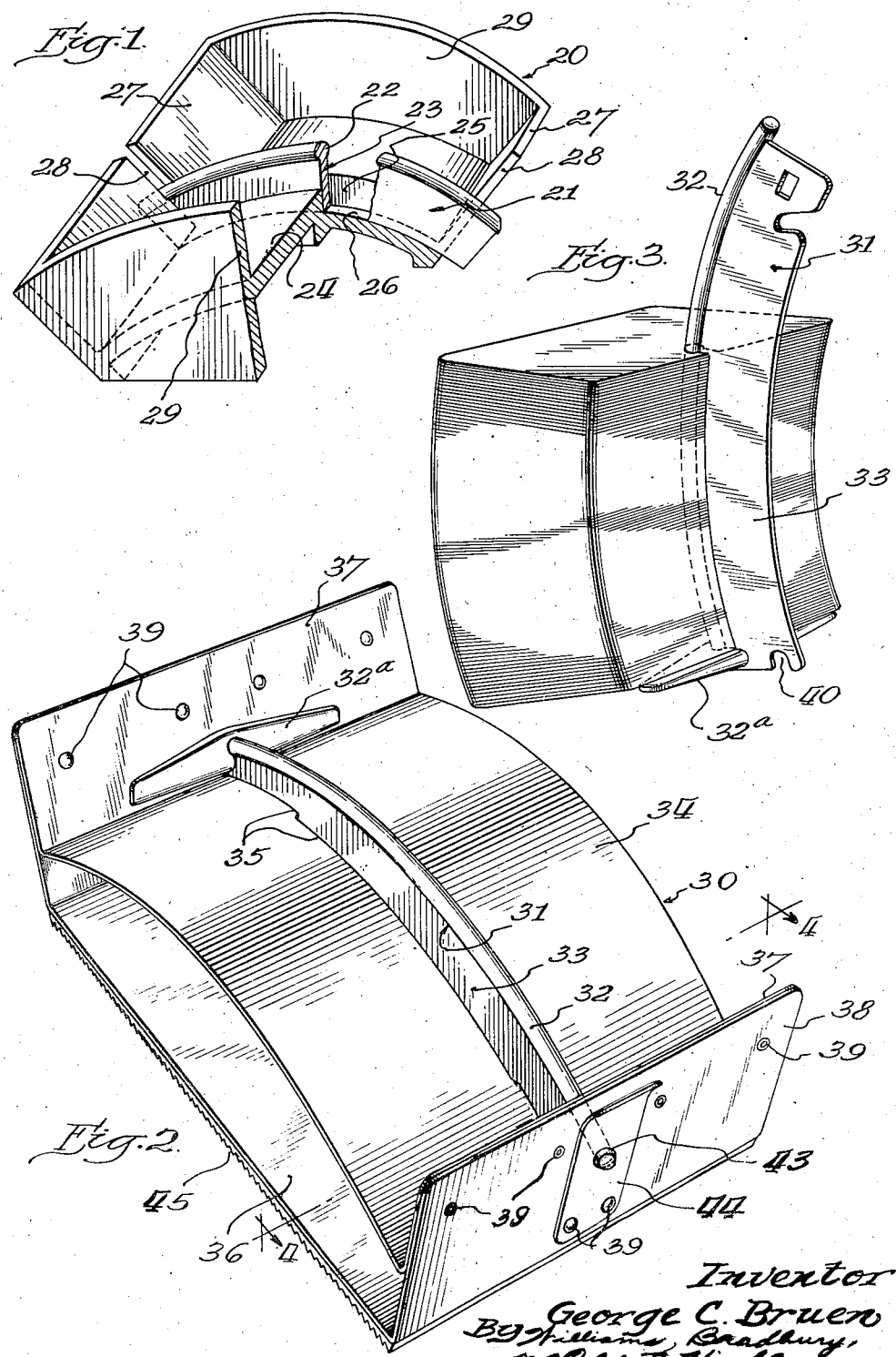
Inventor
George C. Bruen

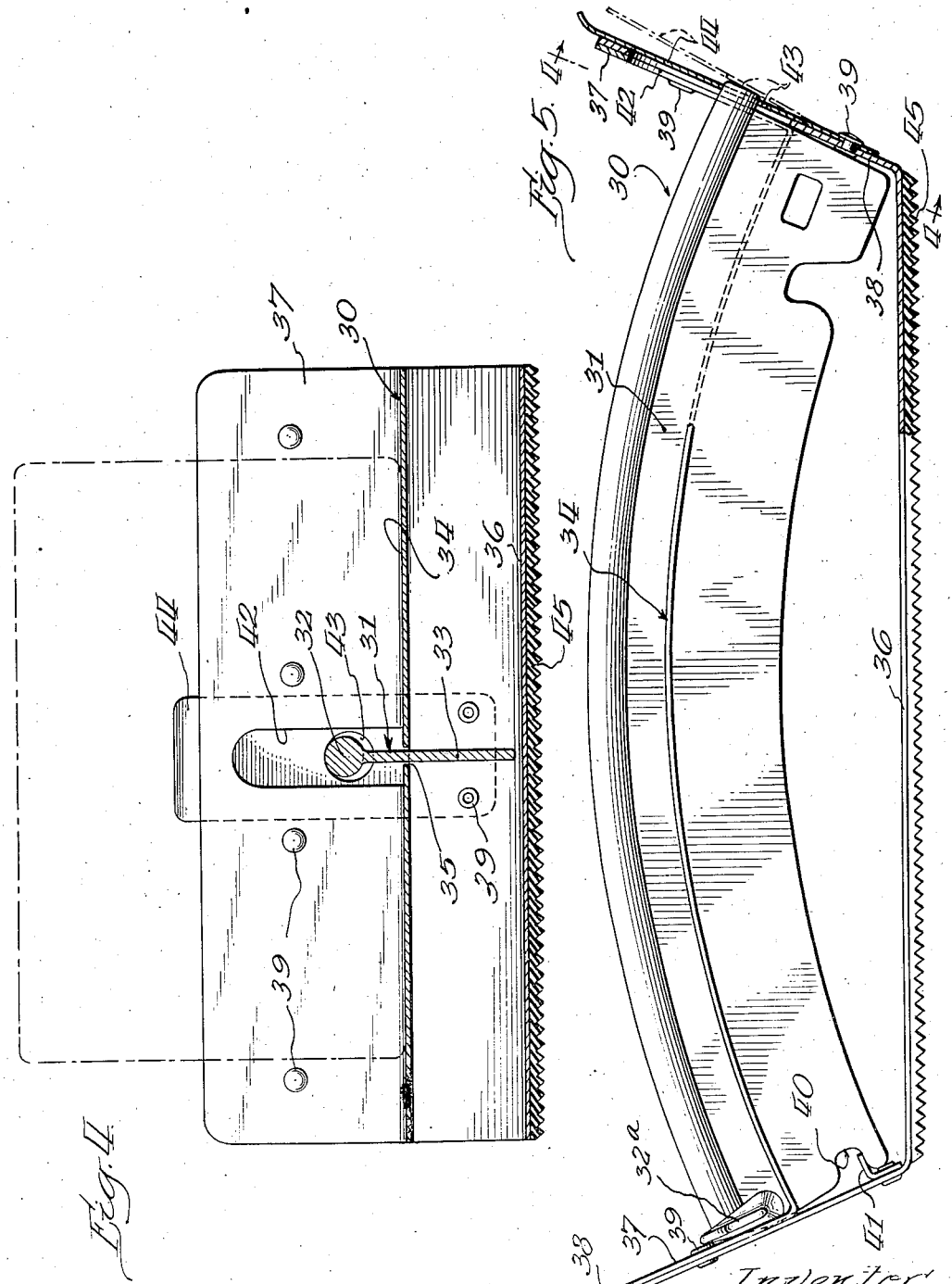

April 29, 1941.  G. C. BRUEN  2,240,325
CARD TRAY
Filed Aug. 7, 1939  5 Sheets-Sheet 3
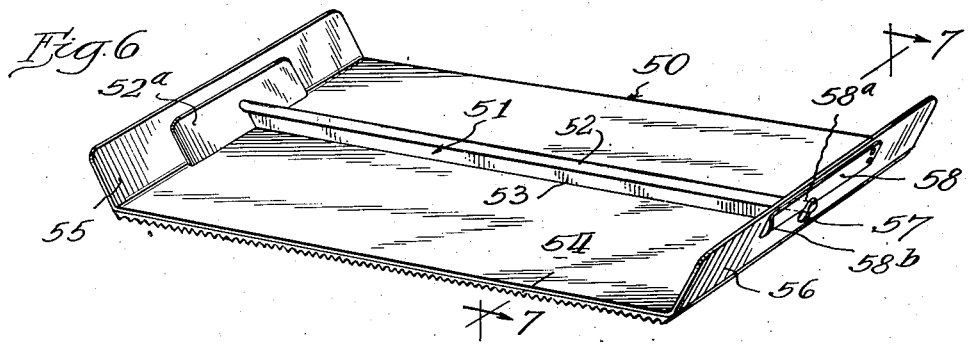
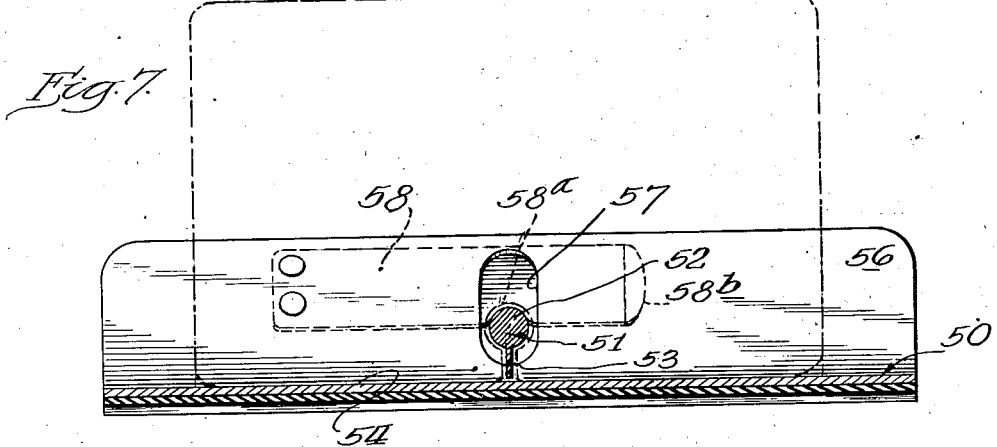
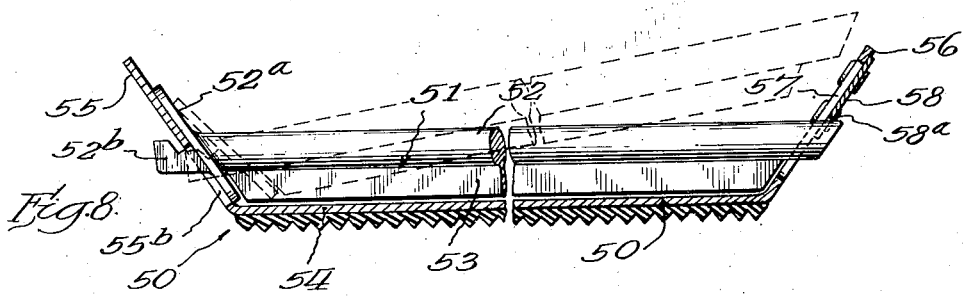
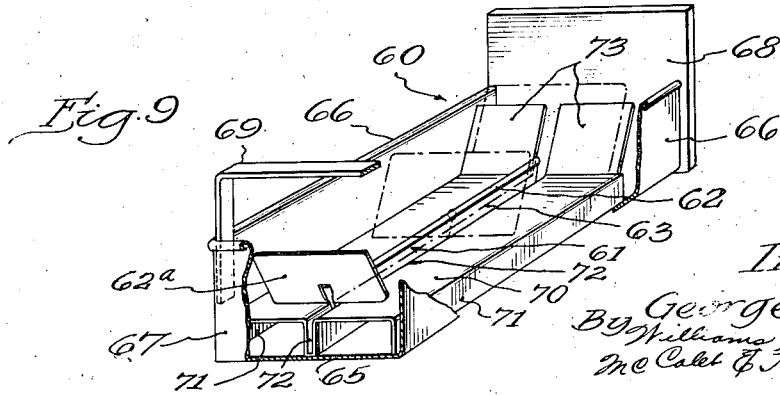
Inventor:
George C. Bruen
By Williams, Bradbury,
McCaleb & Hinkle. Attys.

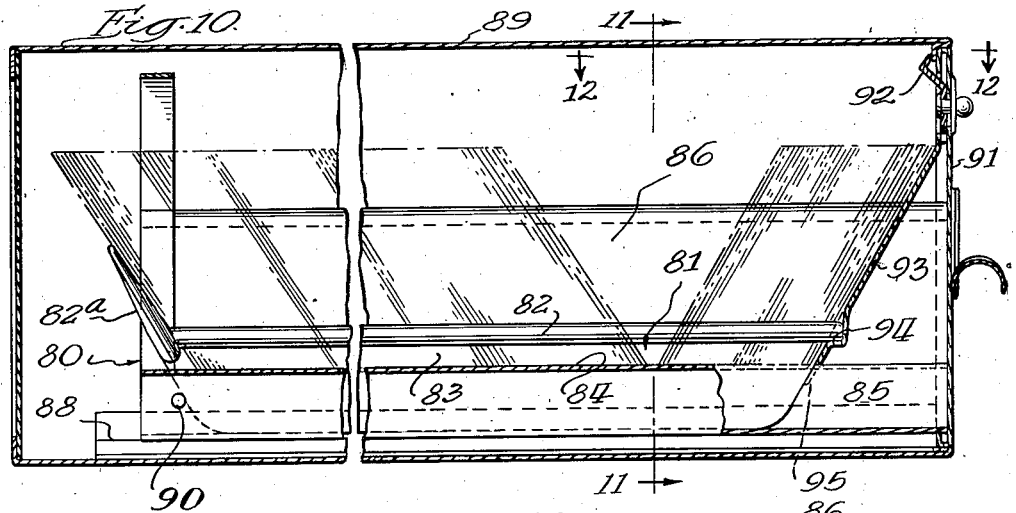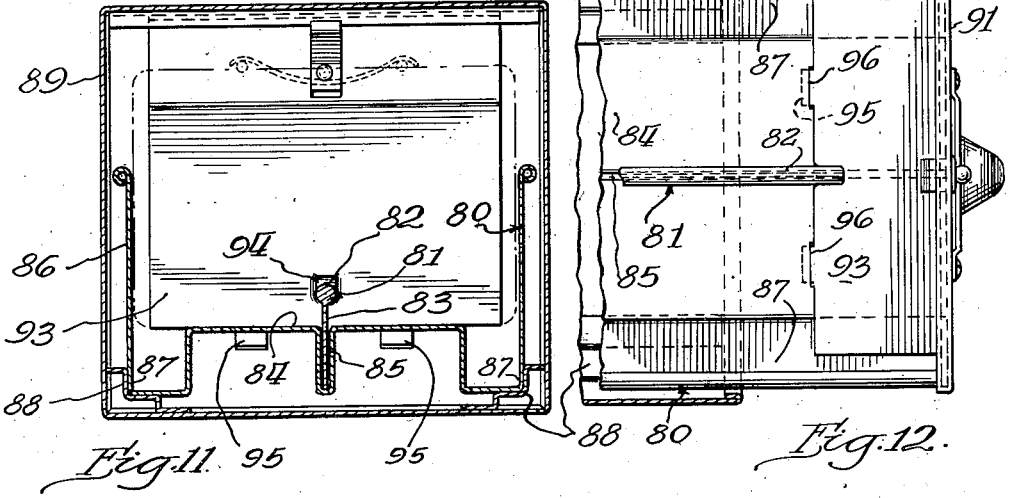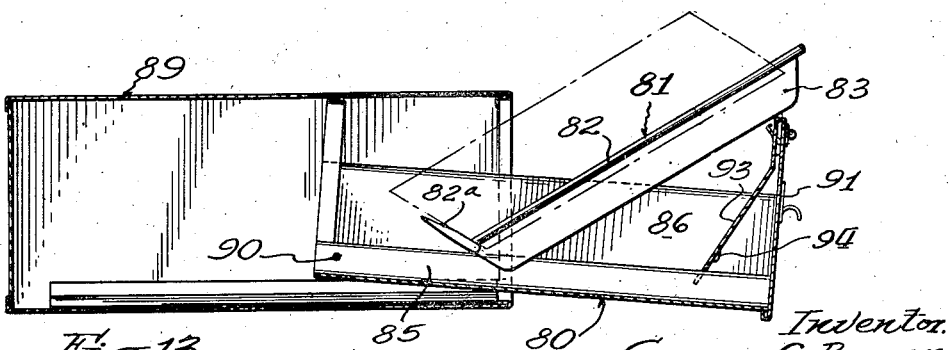

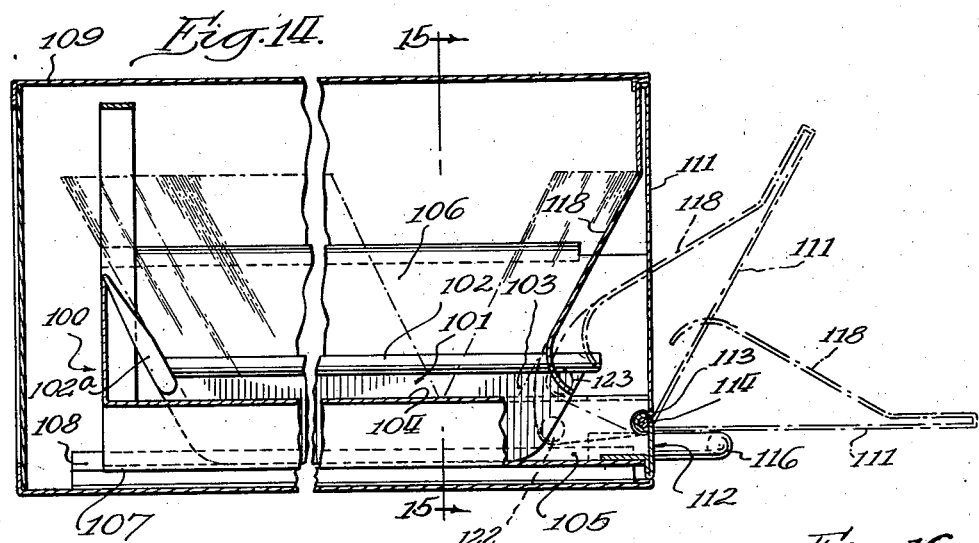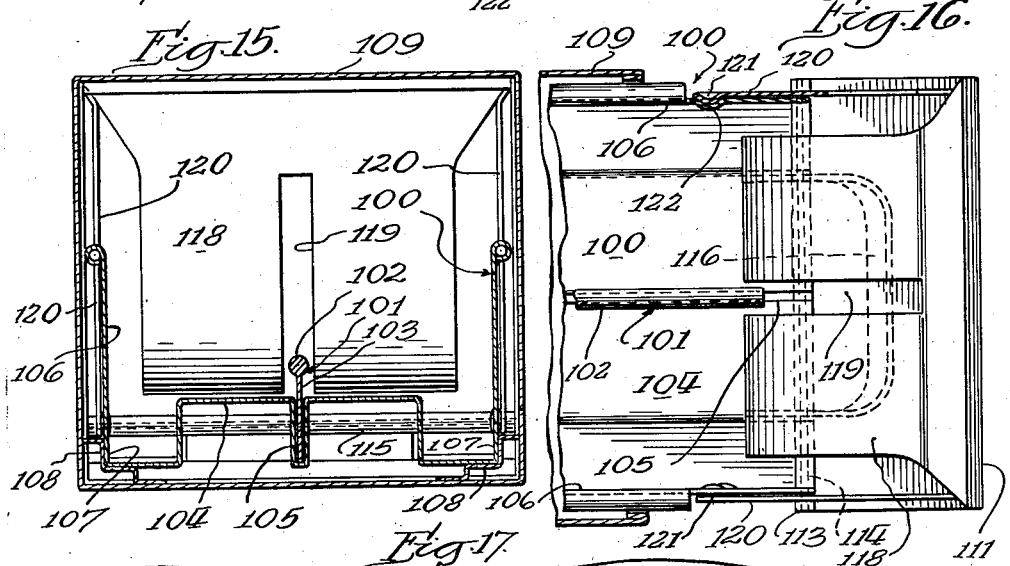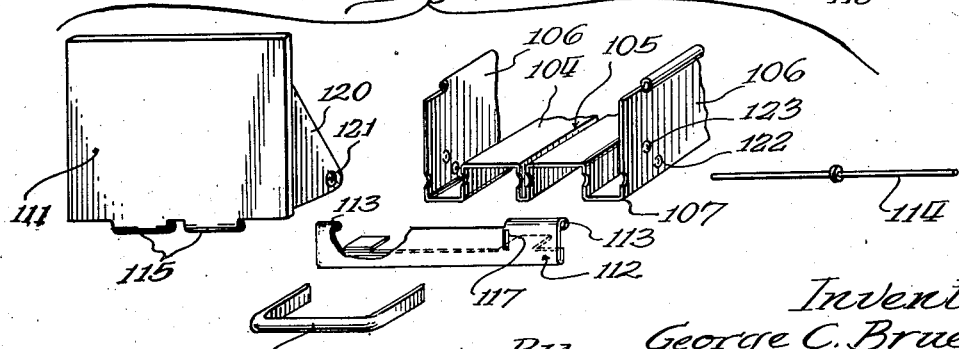

Patented Apr. 29, 1941

2,240,325

UNITED STATES PATENT OFFICE 2,240,325

CARD TRAY

George C. Bruen, Chicago, Ill., assignor to Rotary Index Co., Inc., Chicago, Ill., a corporation of Illinois Application August 7, 1939, Serial No. 288,710

17 Claims. (Cl. 129—16)

My invention relates to card trays, and especially to desk or drawer trays which hold reference or posting cards for inspection or storage. My invention is especially concerned with card trays in which the cards are mounted on a rail with an enlarged running head by means of keyhole-shaped slots in the bottom edges of the cards.

This application is a continuation in part of my application Serial No. 718,126 filed March 30, 1934, and issued as Patent No. 2,168,323 of August 8, 1939.

One object of my invention is a desk tray for receiving a rail section removed—with cards thereon—from a rotary card index such as that shown in my prior patent, whereby a section of the cards normally carried by the wheel can be removed and set on a desk or counter for convenient intensive inspection or entry, without the necessity of removing the cards from the rail section. This is especially convenient when the cards normally held by such a rotary card index wheel are to be temporarily distributed for intensive work among a number of operators who could not so conveniently simultaneously inspect their cards on a wheel.

Another object of my invention is a desk tray for receiving such an arcuate rail section provided with a fixed or integral stop at one end.

Another object of my invention is a desk tray for receiving straight rather than arcuate rail sections.

A further object is a drawer arranged to receive a rail section with cards thereon, whereby the drawer may be used as a desk tray or for storage of cards in cabinets.

A still further object of my invention is a drawer for receiving rail sections with cards thereon arranged with a movable front for facilitating inspection of the cards and facilitating the ready loading or unloading of cards en masse over the end of the rail section.

The foregoing, together with further objects, features and advantages of my invention are set forth in the following description of specific embodiments thereof and illustrated in the accompanying drawings, wherein:

Fig. 1 is a perspective view. partly broken into section, of a desk tray with a card-carrying arcuate rail section received therein;

Fig. 2 is a perspective view of another form of desk tray receiving a card-carrying arcuate rail section having a fixed stop at one end;

Fig. 3 is a perspective view of the rail section itself of Fig. 2 with the cards thereon, illustrating how the cards are carried on the rail section between the card wheel and the tray;

Fig. 4 is a transverse vertical section taken on the line 4—4 of Fig. 2;

Fig. 5 is a side elevation of the tray of Fig. 2 broken into longitudinal vertical sections at one end;

Fig. 6 is a perspective view of another form of tray receiving a straight rail section;

Fig. 7 is a transverse vertical section taken on the line 7—7 of Fig. 6;

Fig. 8 is a longitudinal vertical section of the tray of Fig. 6;

Fig. 9 is a perspective view, partially in section, of a false bottom in the standard cabinet drawer, whereby the drawer is adapted to receive a rail section with cards thereon;

Fig. 10 is a longitudinal section of a cabinet and another form of drawer built especially to receive a card-carrying rail section;

Fig. 11 is a transverse section thereof taken on the line 11—11 of Fig. 10;

Fig. 12 is a longitudinal horizontal section of the front end of Fig. 10 and taken on the line 12—12 of Fig. 10;

Fig. 13 is a view similar to Fig. 10 but on a smaller scale and showing the card-carrying rail section being inserted or removed from the drawer;

Fig. 14 is a longitudinal vertical section of another form of drawer especially made to receive a card-carrying rail section;

Fig. 15 is a transverse vertical section taken on the line 15—15 of Fig. 14;

Fig. 16 is a plan view of the drawer partially extended from the cabinet with the drawer front swung to an intermediate position; and Fig. 17 is an exploded perspective view of the several parts constituting the front end of the drawer.

In Fig. 1 I have shown a desk tray 20 with a card-carrying rail section 21 received therein. The rail section is arcuate in side elevation and in transverse cross-section. It comprises a rail head 22 and a rail flange 23. The rail section 21 is a rail section, such as shown in my said Patent No. 2,168,323, for mounting cards about the rim of a wheel so that the cards lie more or less radially of the axis of the wheel. In the form shown in Fig. 1, the rail does not necessarily have a stop at either end. It will be understood that the cards have keyhole-shaped slots extending upwardly from their bottom edges centrally thereof, whereby they are mounted on the rail section. The cards may remain on the rail section while the rail section is removed from the wheel and set into the tray.

The tray 20 has a floor 24 arcuately conformed to be a portion of a cylindrical surface concentric with the rail section when the rail section is mounted in the tray. A slot 25 is formed in the bottom of the tray, the bottom of the slot preferably being concentrically arcuate. The lower margin of the rail flange 23 is received in the slot 25, and the rail section is supported in the tray by the bottom edge of the rail flange resting on the bottom 26 of the slot. The tray has upwardly and outwardly inclined end walls 27, which hold the cards from running off the rail when the rail is in the tray. Slots 28 are provided in the end walls of the tray and extend down as far as necessary to accommodate the rail head and extend below the rail head as narrower slots to accommodate the rail flange 23. The tray may optionally carry side walls 29 to protect the cards against lateral injury and to serve as a convenient hand rest in manipulating the cards. The bottom surfaces of the tray are formed to present adequate support, whereby the tray may be set upon the desk or counter top. The rail section, with cards thereon, may be mounted in the tray by setting the rail section down vertically into the tray. The arcuate form of the rail section brings the ends of the rail section so near the desk top that the rail section may not inadvertently slide longitudinally out of the tray. However, if it is desired quickly to remove all of the cards from the rail section without removing the cards from the tray, this may be done by slightly elevating one end of the tray and withdrawing the rail section endwise from the tray and out of the slots in the cards. In some circumstances this offers a quicker way of rearranging the cards, adding new cards, and taking out old cards, than flipping individual cards off from or on to the rail section.

In Fig. 2 I have shown a desk tray of very simple and inexpensive construction, which is particularly adapted for receiving an arcuate rail section with an integral stop at one end, such as shown in my prior Patent No. 2,168,323 and, more especially, in my application Serial No. 168,993 filed October 14, 1937, as removably mounted on a card wheel. Here the tray 30 receives an arcuate rail section 31 having a characteristic rail head 32 and rail flange 33. A winged stop 32a is integrally carried by one end of the rail section. The purpose of the stop 32a is partly to segregate the cards to the respective rail sections and preclude this inter-sectional migration when the rail sections are on the card wheel, and partly to keep the cards from running off the bottom end of the rail section when the upper end is held in the hand to carry the rail section and cards, as shown in Fig. 3.

The tray 30, which may conveniently be formed almost wholly of sheet metal, has an arcuate floor 34 concentric with the rail section. The floor 34 has a longitudinal slot 35 extending throughout its length for reception of the rail flange 33. The floor 34 is spaced a distance above the tray bottom 36 so that the lower portion of the rail flange 33 may extend below the tray floor 34, and thus the floor 34 may support, or partially support, the lower edges of the cards carried by the rail section. The piece of sheet metal which constitutes the floor 34 carries upturned ends 37. Somewhat similarly the sheet metal piece constituting the bottom 36 has upturned ends 38.

The adjacent upturned ends 37 and 38 are secured together as by rivets 39 to constitute front and end walls for the tray at normals to the rail section at its respective ends. At its back end—that is, the end which carries the stop 32a—the rail flange 33 has a rearwardly opening end slot 40, in which is received a tray-carried locking element 41. When the rail section is inserted in the tray, the rear end of the rail flange is first inserted through the slot 35 and shifted backwardly until the element 41 is received in the end slot 40 of the rail flange. This prevents the inadvertent subsequent lifting of the back end of the rail from the tray. The back end of the rail section may be supported by the back end of the rail flange engaging the bottom 36, or by the stop 32a engaging the floor 34.

The front end of the rail head 32 projects a little farther than the front end of the rail flange 33. Thus, while the rail flange does not extend farther than the front wall of the tray, the front end of the rail head extends through the slot 42 in the front end of the tray and through a hole 43 in a spring strip 44. The lower end of the spring strip is secured to the tray front, while the upper end extends up to the top margin of the tray front, where it is offset for convenient manual engagement to spring the strip 44 forwardly and release the protruding end of the rail head 32 from the hole 43. Thus, in mounting the rail section with cards thereon in the tray, after the rear end of the rail section has been anchored, as previously described, the front end of the rail section is swung downwardly until the protruding end of the rail head passes into the slot 42, and then engages the spring strip 44 camming it outwardly until the protruding end of the rail head enters the hole 43, whereupon the spring strip 44 will snap back against the front wall, locking the front end of the rail section.

This desk tray makes it feasible to inspect the cards either on the card wheel or on a desk, and a section of cards may readily, safely and conveniently be transferred from a card wheel to the desk tray because the end stop keeps the cards from running off the bottom end of the rail section, and the rail flange prevents the cards turning on the rail head so that the cards are maintained in proper alignment.

After the rail section, with cards thereon, has been mounted in the tray, if it is desired to remove a number of the cards en masse, this may conveniently be done by pulling the spring strip 44 forwardly to release the front end of the rail, and lifting the front end of the rail an inch or two to expose the end of the rail for en masse movement of a large group of cards off the end of the rail. Conversely, additional cards may be loaded on to the rail over the end thereof by thus exposing the end of the rail section.

To prevent injury to a desk or counter top and to prevent sliding of the tray, the underside of the tray bottom 36 preferably carries a transversely corrugated rubber sheet 45 adhered to the bottom.

Despite the fact that the tray floor 34 carries no vertical reinforcing flange, it is well supported in its arcuate position concentric with the rail section, because of the fact that it constitutes an arch well anchored at its ends to the end wall of the tray. This makes for a very simple and inexpensive construction.

In Figs. 6 to 8 I have shown a desk tray 50 which receives and mounts a rail section 51 which, instead of being arcuate, is straight. The straight rail head 52 carries a fixed stop 52a at one end. The rail flange 53, however, is not deep enough to extend below the tray floor 54, but instead it rests upon the tray floor. The tray floor 54 may conveniently constitute the bottom wall of the tray as well, since it contains no longitudinal slot for the rail flange. The tray floor 54 carries an obliquely upturned rear end 55, which is engaged flatwise by the rail stop 52a. The tray floor 54 has a similar upturned front end 56 with a central slot 57 for accommodating the protruding end of the rail head 52. The protruding end of the rail head is locked in place against upward movement by a spring strip 58, which lies laterally along the front end 56, and is secured thereto at one end of the strip. The strip 58 partially overlies the slot 57 and on its underside carries a slot 58a for embracing the top of the protruding end of the rail head. The free end 58b of the spring strip 58 is turned outwardly for convenient manual engagement to pull the spring strip clear of the protruding end of the rail head so that the rail may be lifted up for removal. The rear end of the rail section is anchored to the rear end of the tray by a hook-like extension 52b of the rail head beyond the stop 52a, which engages in a slot 55b in the upturned rear end 55.

As shown by dotted lines in Fig. 8, to mount the rail section in the tray, the back end of the rail section is first lowered so that the bottom of the rail flange, or of the rail stop, lies on the floor 54, and then the rail is moved rearwardly until the rail stop 52a contacts the upturned rear end 55. Then the front end of the rail section is lowered. This results in the hook 52b hooking into the slot 55b. As the protruding end of the rail head 55 enters the slot 57, it cams the spring strip 58 outwardly until the protruding end of the rail head enters the slot 58a, when the spring strip will snap back against the front end of the tray, locking the front end of the rail section.

One advantage of locking the rail sections in the tray is that the tray can be carried around freely without danger of the rail section falling out of the tray, even if the tray should be held upside down.

In Fig. 9 I have shown a drawer 60 of standard construction and of the type customarily used for cards. In this I mount a card-carrying rail section 61. The rail section 61 is straight rather than arcuate. It can be used on a polygonal card wheel (as distinguished from an arcuate card wheel which would require arcuate rail sections) for more active inspection of the cards. At seasons when the cards are not to be the subject of very active inspection, they can be stored by placing them in the drawers and placing the drawers in cabinets, in such a way that the cards can still be inspected as conveniently as in the customary card drawer files.

The rail section 61, shown in Fig. 9, has a rail head 62, a deep rail flange 63, and a rail stop 62a at one end of the rail section and preferably inclined rearwardly. The drawer 60 comprises a plain bottom 65, sides 66, rear end 67, and a drawer front 68. The usual yoke 69 may be carried by the end of the drawer normally to keep the drawer from being pulled entirely out of the cabinet.

In order to adapt this standard drawer to the reception of the rail section 61, I provide a false bottom 70, preferably formed from a single piece of sheet metal. It has down turned lateral flanges 71 to space it above the drawer bottom. Along its longitudinal center line the false bottom 70 has a narrow U-shaped flange going down to the drawer bottom and defining a central slot 72 for the reception of the rail flange 63. The central slot 72 is of such depth that when the rail flange 63 rests on the bottom of the central slot, the rail head 62 will be high enough above the false bottom 70 substantially to reach and support, or partially support, the bottom edges of the cards.

On each side of the central slot 72 the sheet metal stock of the false bottom 70 is turned obliquely upwardly to form oblique front card rests 73. The stop 62a forms an oblique rear card rest.

In Figs. 10 to 13, I have shown a drawer especially made for receiving a card-carrying rail section, as distinguished from a false bottom to be added to a standard drawer to be adapted to that purpose.

The drawer 80 receives and mounts a card-carrying rail section 81 which comprises a rail head 82, a deep rail flange 83, and an integral stop 82a carried at one end of the rail section. The rail section may, as previously described, be removed, with cards on it, from a polygonal card wheel. The drawer bottom is formed to provide a drawer floor 84 for the bottom edges of the cards, with a central longitudinal slot 85 extending therealong for reception of the rail flange 83. The lateral margins of the drawer bottom are depressed, where they join the drawer sides 86, to form salient drawer runners 87 which slide in the ways 88 of the drawer cabinet 89. Rearward movement of the rail section in the drawer bottom may be limited by a cross-piece 90 extending across the central slot 85 for engagement by the rear end of the rail flange. The drawer front 91, which is secured to the forward edges of the sheet metal piece which form the drawer bottom and sides, is also formed from sheet metal. The drawer front is rebent upon itself upon its margins to form marginal reinforcements. The rebending at its top, however, is a very deep rebending which extends for an inch or so down from the top to form a portion of double thickness for convenient mounting of the drawer latch 92, and therebelow it extends downwardly and forwardly as an oblique front rest 93. Near the bottom end the front rest 93 is centrally pressed forwardly to form a socket 94 for receiving the protruding front end of the rail head 82. At its bottom edge the front rest 93 may be anchored to the drawer floor 84 by tongues 95 extending through slots 96 in the drawer bottom.

In Figs. 14 to 17, I have shown another form of drawer especially constructed for the purpose of receiving card-carrying rail sections and including the further feature of a hinged drawer front, which can be swung down to expose the end of the rail section for endwise removal or loading of cards without having to remove the rail section from the drawer.

The drawer 100 receives and mounts a rail section 101. The rail section has a rail head 102, a deep rail flange 103 and a stop 102a fixed at the rear end of the rail section. The sheet metal stock of the drawer is formed, in much the same manner as in the form of Figs. 10 to 13, to provide a drawer floor 104, a central slot 105 for reception of the rail flange, drawer sides 106, and lateral drawer runners 107 for reception in the ways 108 of the cabinet 109.

The drawer front 111 is pivotally mounted on the drawer. The drawer front has a fixed base portion 112, which is secured to the front end of the sheet metal piece forming the floor and sides. Portions of the upper edge of this fixed base 112 are rolled to form pintle bearings 113 for the pintle 114. Portions of the bottom edge of the hinged drawer front 111 are rolled into beads to form the front-carried bearing 115 for the pintle.

An U-shaped handle is provided for the drawer, its legs extending rearwardly through slots 117 in the fixed base 112 and secured to vertical flanges of the drawer floor. This mounts the handle below the pintle and below the hinged drawer front.

The sheet metal stock of the hinged drawer front is turned back upon itself to form an upper portion of the drawer front of double thickness and therebelow extends forwardly and downwardly as an oblique front rest 118 for the cards. The oblique or card-rest portion of the drawer front 118 has a central slot 119 to enable it to straddle the rail 101.

The hinged drawer front 111 is normally held in an upright or vertical position by means of lateral wings 120 extending rearwardly from the drawer front, each carrying a detent embossment 121 resiliently engaging a mating detent embossment 122 on the adjacent drawer side 106. When the cards are to be inspected in the drawer, it is advisable that the cards be permitted to incline forward farther and that more longitudinal space be allowed for the cards. For this purpose, the drawer front may be swung downwardly to the intermediate dotted-line position of Fig. 14, and held in that position by the detents 121 engaging a second set of detents 123 on the drawer sides. If it is desired to expose the end of the rail section, either for a more convenient reception or removal of the rail section, or to permit loading or unloading of the cards over the end of the rail section, the drawer front can be swung down to the horizontal dotted-line position of Fig. 14, where it will be supported by the drawer handle.

The lower end of the drawer front-carried card rest panel 118 is free and unattached to the drawer. Preferably its lower margin is turned forwardly to present a rounded end which will not injure the cards when the drawer front is swung upwardly to vertical position. The front rest 118 thus acts somewhat as a drawer compressor to press the cards together when the drawer front is returned to vertical position. The rail section, with cards thereon, can be set down into, or removed from, the drawer when the drawer front is in the vertical full line position of Fig. 14, or in the intermediate dotted-line position, or in the horizontal position.

While I have described and illustrated these specific embodiments of my invention, I contemplate that many changes and substitutions may be made thereover without departing from the scope or spirit of my invention.

I claim:

1. The combination, with an arcuate rail section, comprising a head and a flange constructed and arranged to receive a multiplicity of cards having keyhole-shaped slots at their lower edges for embracing the rail and flange to mount the cards thereon—of a tray for receiving the rail section and cards, the tray comprising a convexly arcuate bottom, obliquely diverging front and rear walls, an open top, and slots extending downwardly into the front and rear walls at a midline thereof and extending across the bottom wall for receiving and supporting the rail section, the rail section being arcuately removable from the tray without removing the cards.

2. The combination, with an arcuate rail section, comprising a head and a depending longitudinal flange adapted to receive and mount a multiplicity of cards arranged transversely thereof, and also being constructed and arranged for mounting, together with like rail sections about the periphery of the mounting wheel of a rotary card index—of a desk tray for mounting the rail section with cards thereon for inspection, the tray comprising an arcuately convex floor for engagement by the bottom edges of the cards, a longitudinal medial slot in the floor for reception of the rail flange, and front and rear ends forming end rests for the cards.

3. The combination, according to claim 2, wherein the tray has means for releasably locking the rail section to the tray.

4. As an auxiliary to a rotary card index wheel having arcuate peripheral rail sections removably mounted end to end thereon for supporting a multiplicity of cards more or less radially of the wheel by virtue of keyhole-shaped slots in the bottom edges of the cards—a desk tray for receiving and mounting such a rail section with cards thereon removed from the wheel for more concentrated inspection of the cards, the tray comprising an arcuately convex floor agreeable to the arc of the rail section, whereby the floor partially supports the bottom edges of the cards, a slot extending longitudinally across the floor for reception of the flange of the rail, front and back card rests carried by the tray, and means for detachably locking the rail in the tray.

5. The combination of a card-carrying rail section comprising a longitudinally extending rail head, a longitudinally extending vertical flange depending from the head, and a card stop carried by one end of the rail section, and a desk tray having a floor with a longitudinally extending central slot therein receiving the lower margin of the flange, and means for releasably locking the rail in the tray, the floor of the tray being disposed at a uniform distance below the rail head at least partially to support the bottom edges of the cards and permit their being shifted along the rail.

6. The combination of rail section and desk tray, according to claim 5, wherein the locking means comprise interengaging anchoring elements carried by the tray and one end of the rail section respectively and co-operating latch elements carried by the tray and the other end of the rail section respectively.

7. The combination of a rail having a rail head and depending flange, both extending substantially throughout the length of the rail and adapted slidably to mount a multiplicity of cards arranged transversely of the rail by virtue of keyhole-shaped slots in the bottom edges of the cards—of a desk tray receiving the rail with cards thereon, the tray having a floor spaced a uniform distance below the rail head for at least partially supporting the bottom edges of the cards but permitting shifting of the cards along the rail, and means for mounting the rail on the tray to permit removal of the rail, with cards mounted thereon, from the tray.

8. The combination of rail and tray, according to claim 7, wherein the tray has an upwardly and outwardly inclined end wall at each end to serve as an end rest for the cards and to keep the cards from passing off the ends of the rail.

9. The combination of rail and tray, according to claim 7, wherein the rail carries a card stop at one end and the tray has an end wall at the other end to keep cards from passing off the said other end of the rail.

10. The combination with a card-carrying rail section having a rail head and a depending flange, both extending substantially throughout the length of the rail section, and a stop carried by one end of the rail section—of a desk tray receiving and mounting the rail section with cards thereon, comprising a bottom sheet adapted to rest flatwise on a desk top and having upwardly and outwardly turned ends, a floor sheet extending across the tray a spaced distance above the bottom sheet and having similarly upturned ends flatwise engaging and secured to the respective upturned ends of the floor sheet, and a longitudinal central slot through the floor sheet in which slot the rail flange is received to bring the floor a uniform distance below the rail head, interengaging elements carried by one end of the rail flange and by the adjacent end of the tray for hookingly anchoring the one end of the rail on the tray, the other end of the rail head protruding beyond the rail flange, an opening in the adjacent upturned ends of the sheets through which opening the protruding end of the rail head extends, and a latch plate mounted on the end of the tray overlying the opening and having a hole for latchingly receiving the protruding end of the rail head, the plate being normally urged inwardly but being outwardly movable to clear the protruding end of the rail head to permit the end of the rail to move upwardly in removing the rail section, the latch-carrying end of the tray keeping the cards from running off the adjacent end of the rail section.

11. The combination of rail section and tray according to claim 7 wherein the rail section is longitudinally arcuate and the floor is concentrically arcuate.

12. The combination of a card-carrying straight rail having a rail head and depending flange, both extending substantially the length of the rail, and a card stop carried by one end of the rail, and a desk tray comprising a floor-forming bottom sheet adapted to rest flatwise on a desk top and having obliquely upturned front and back ends, the rail section being mounted on the tray between its ends and with the lower margin of the flange extending substantially to the floor, a slot in the back end of the tray, the rail having a hook extending rearwardly of the stop hooked into the slot to anchor the rear end of the rail to the tray, and the front end of the rail head protruding beyond the flange, a hole in the front end of the tray through which the protruding end of the head extends, a latch plate yieldably mounted on the front side of the front end of the tray and having a slot for latchingly receiving the end of the head whereby to anchor the front end of the rail, the rail being receivable by, and removable from, the tray while the cards are on the rail.

13. The combination with a standard card container of the class consisting of trays and drawers and a card-carrying rail section having a rail head and a depending flange, both extending substantially the length of the rail, and a card stop carried at one end of the rail—of means for adapting the container removably to receive and mount the rail section with cards thereon, comprising a false bottom formed to present a floor arranged to come a uniform distance below the rail whereby at least partially slidably to support the bottom edges of the cards, a central longitudinal slot for receiving the lower part of the flange, and an obliquely upturned end adjacent the end of the rail section opposite the stop and serving as a card rest and to keep the cards from running off that end of the rail section.

14. The combination with a card container of the class consisting of trays and drawers of a card-carrying rail section having a rail head and depending flange, both extending substantially the length of the rail section, and a card stop carried at one end of the rail section, the container having a bottom conformed to present a floor a uniform distance below the head for at least partially slidably supporting the bottom edges of the cards mounted on the rail section, and a central longitudinal slot in the floor for receiving the lower part of the flange whereby removably to receive and mount the rail section in the container with cards thereon.

15. In card filing equipment, the combination of a tray-like body of the class comprising drawers and desk trays, and a card mounting rail mounted in the body, the rail comprising a head extending along its upper edge and a flange depending from the head, the rail being adapted to enter complementary keyhole slots in the bottom edges of a multiplicity of cards whereby to mount the cards on the rail more or less at right angles thereto, for movement along the rail and for individual upward flexing removal therefrom, the body being constructed and arranged for receiving and mounting the rail medially lengthwise of the body for downward insertion, and upward removal, of the rail with the cards mounted thereon, the body having a floor on either side of the rail for supporting engagement with the bottom edges of the cards to limit substantial vertical rocking of the cards about the rail.

16. In card filing equipment, the combination according to claim 15, wherein the rail carries a stop at one end to prevent the cards moving longitudinally off that end of the rail, wherein the other end of the rail is open for longitudinal removal of cards en bloc off the free end of the rail when the rail is removed from the body, and wherein the body includes a stop member cooperating with the rail to prevent movement of the cards longitudinally off the said free end of the rail when the rail is mounted in the body.

17. In card filing equipment, the combination according to claim 15, wherein the floor of the body contains a medial longitudinally extending upwardly opening slot into which the lower portion of the rail flange extends when the rail is mounted in the body, whereby the card supporting floor comes at a height intermediate the head and bottom edge of the rail, and wherein the rail flange is correspondingly deeper than the neck of the keyhole slot in the cards the rail is adapted to mount.

GEORGE C. BRUEN.